United States Patent [19]

Soikkeli

[11] Patent Number: 5,143,314
[45] Date of Patent: Sep. 1, 1992

[54] APPARATUS FOR WINDING AN INSULATION PLY

[75] Inventor: Osmo Soikkeli, Lappeenranta, Finland

[73] Assignee: Oy Partek Ab, Parainen, Finland

[21] Appl. No.: 623,803

[22] PCT Filed: Jun. 14, 1989

[86] PCT No.: PCT/FI89/00115
§ 371 Date: Feb. 13, 1991
§ 102(e) Date: Feb. 13, 1991

[87] PCT Pub. No.: WO89/12776
PCT Pub. Date: Dec. 28, 1989

[30] Foreign Application Priority Data

Jun. 23, 1988 [FI] Finland ................. 883043

[51] Int. Cl.⁵ ............ B65H 18/00; B65H 18/08; B65H 20/24; B65H 81/06
[52] U.S. Cl. ............... 242/67.10 R; 242/65; 242/67.2; 242/75.1
[58] Field of Search ......... 242/67.1 R, 67.2, 67.3 R, 242/75.1, 75.2, 65, 56 A

[56] References Cited

U.S. PATENT DOCUMENTS

| | | | |
|---|---|---|---|
| 1,959,418 | 5/1934 | Fourness | 242/75.1 |
| 2,742,240 | 4/1956 | Stephens et al. | 242/65 |
| 3,161,363 | 12/1964 | Press | 242/56 A |
| 3,848,823 | 11/1974 | Mitchell | 242/56 A |
| 4,191,341 | 3/1980 | Looser | 242/67.1 R |
| 4,830,808 | 5/1989 | Bichot et al. | 242/67.1 R |

FOREIGN PATENT DOCUMENTS

| | | |
|---|---|---|
| 0205714 | 12/1986 | European Pat. Off. . |
| 1080827 | 4/1960 | Fed. Rep. of Germany . |
| 1088006 | 9/1960 | Fed. Rep. of Germany ........ 242/65 |
| 1571482 | 2/1970 | Fed. Rep. of Germany . |
| 7338072 | 11/1973 | Japan ..................... 242/75.1 |
| 206757 | 8/1966 | Sweden . |

Primary Examiner—Daniel P. Stodola
Assistant Examiner—John Q. Nguyen
Attorney, Agent, or Firm—Scully, Scott, Murphy & Presser

[57] ABSTRACT

The invention relates to an apparatus for winding a ply of an insulating material on to a core (8) to form a chute. The apparatus comprises a movable, endless belt (1) which is bent around the core for the time of the winding, so that the insulating material ply is wound between the core and the belt. In order to wind insulating chutes of greatly varying diameter within a space as small as possible, a turnable means (10) is provided outside both edges of the belt in the winding area of the belt, so that they turn perpendicularly to the plane of the belt between a position of readiness and a winding position. The belt (1) is arranged to pass via a roll (19) mounted between said turnable means (10) so as to follow their movement. The roll (19) is displaceable between a receiving/delivering position and a winding position of the core (8). Means (15, 16) are provided in connection with the turnable means (10) for displacing an empty core (8) from the receiving position to the winding position and for displacing a wound core (9) from the winding position to the delivering position.

3 Claims, 3 Drawing Sheets

APPARATUS FOR WINDING AN INSULATION PLY

BACKGROUND OF THE INVENTION

This invention relates to an apparatus for winding a ply of an insulating material on to a core to form a chute, comprising a movable, endless belt arranged to be bent around the core for the time of the winding so that the insulating material ply can be wound on to the core between it and the belt.

The winding of insulating material plies often forms part of a process for the manufacture of insulating chutes, wherein cores with insulation material wound thereon are cured; the cured insulation, is possibly coated with an aluminium foil, for instance; the insulation is sawed open into a chute; and the chutes are removed from the cores, whereafter the empty cores are recycled to the winding step. In general, the cores are transported by an endless conveyor.

In prior art apparatuses, the winding is carried out while the core is positioned on the conveyor. Previously, the lever movements required for bending the belt of the winding means around the core have been long and have required plenty of space. Variation in the chute diameter has been possible within very narrow limits only.

SUMMARY OF THE INVENTION

The object is to provide a new insulation winding apparatus which eliminates the above-mentioned drawbacks and, in particular, is suitable for winding insulation chutes of widely varying diameters.

The winding apparatus according to the invention is mainly characterized in that in the winding area of the belt, outside both edges of the belt, is provided a means turning perpendicularly to the plane of the belt between a position of readiness and a winding position; that the belt is arranged to pass via a roll mounted on the turnable means so as to follow their movement, said roll being displaceable between two positions at different distances from the turning shaft of the turnable means, the position closer to the turning shaft being the winding position of said roll; and that means are provided in connection with the turnable means for displacing an empty core from a receiving position to a winding position and for displacing a wound core from the winding position to a delivering position.

In a preferred embodiment, the winding position of the core is in alignment with the turning shaft of the turnable means, whereat the diameter of the wound core can be varied conveniently within wide limits.

Further preferred embodiments of the winding apparatus appear from the following description, in which a preferred embodiment shown schematically in the attached drawing is referred to, by way of example.

DETAILED DESCRIPTION OF THE PREFERRED EMBODIMENTS

Figure 1:
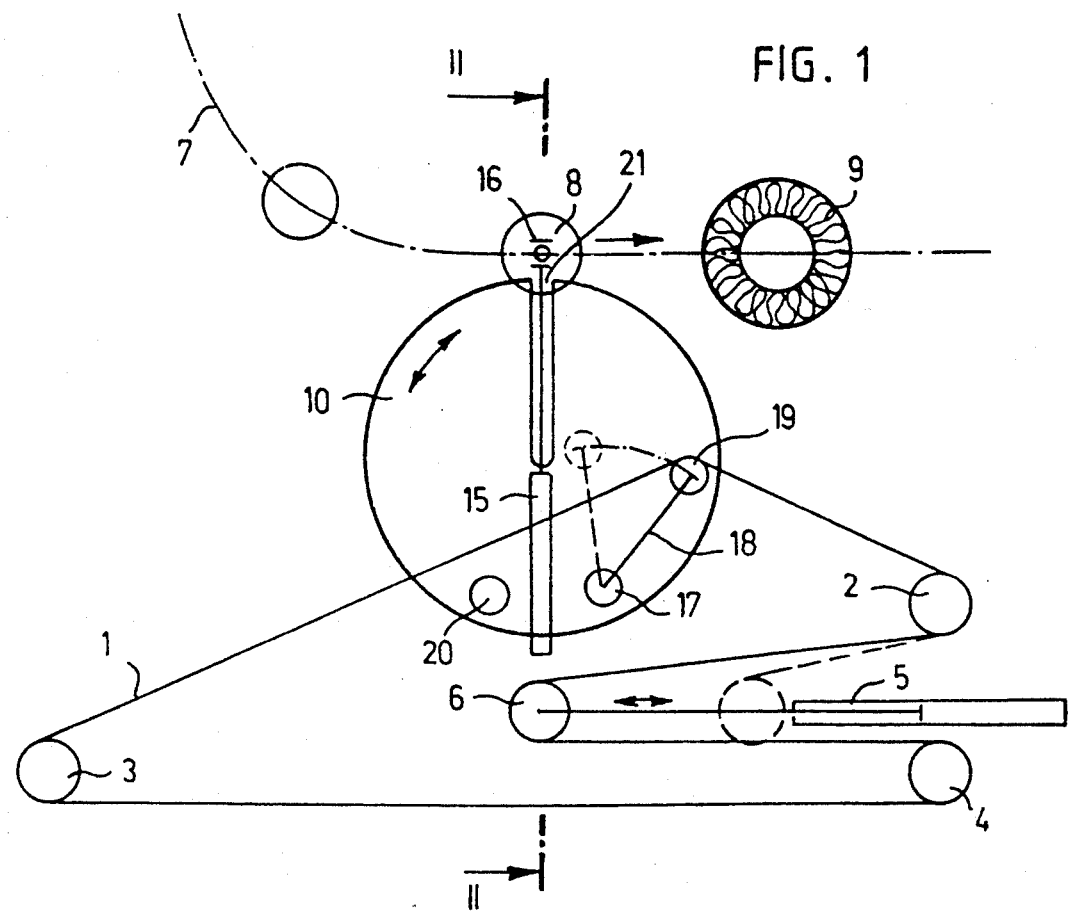
FIG. 1 is a side view of the winding apparatus.
Figure 2:
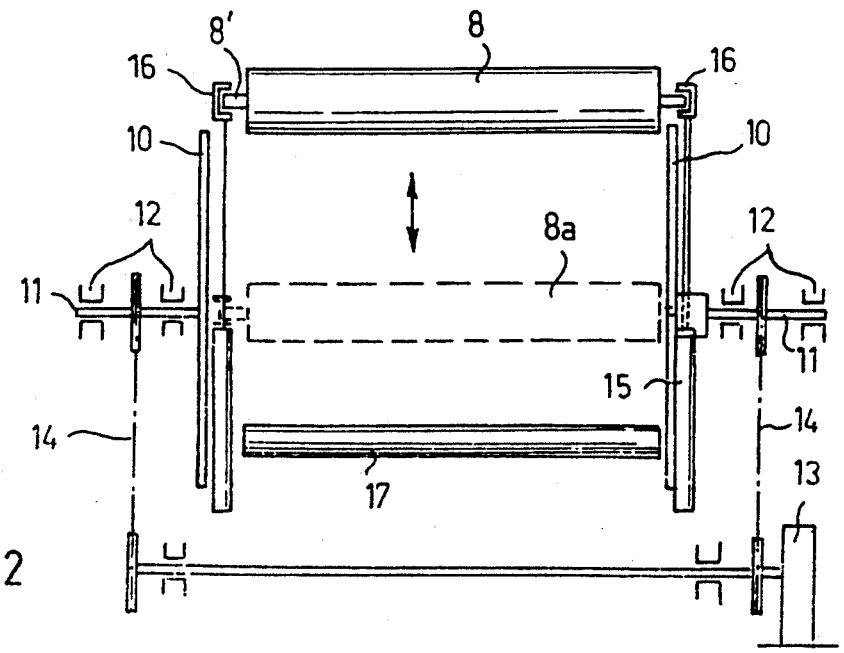
FIG. 2 is a vertical section along the line II—II in FIG. 1.

In the drawing, the reference numeral 1 designates an endless winding belt; and 2 designates a drive roll for the belt 1. The reference numerals 3 and 4 designate fixedly mounted turning rolls which rotate passively; 5 designates a working cylinder the piston rod of which is provided with a turning roll 6 for maintaining the desired tightness of the belt. The single drive roll 2 could be replaced with, e.g., three drive rolls provided with a common chain drive and arranged principally in the same way as the rolls 2, 6 and 4 shown in the drawing, whereby an improved friction transmission is provided when the belt 1 is loose.

The reference numeral 7 designates a so called main conveyor commonly used in the manufacture of chutes; 8 designates an empty core transported to the winding apparatus; and 9 designates a core with an insulation wound thereon when it is being transported to a curing step, for instance.

The reference numeral 10 designates two discs rotatable on a bearing 12 of a shaft 11 by means of a chain transmission 14 driven by a motor 13. A pneumatic or hydraulic cylinder 15 is fastened to each disc 10, and a support 16 engageable with a journal 8' of the core 8 is provided in the end of the piston rod of each cylinder 15. While resting on the supports, the core 8 is displaceable from the plane of the main conveyor 7 to the plane of the shaft of the discs 10; the last-mentioned position is designated with the reference numeral 8a.

Two rolls 17 and 20 are mounted in bearings to the discs 10, and arms 18 are attached to the ends of the shaft of the roll 17. Further, a roll 19 movable between a position close to the periphery of the disc 10 and a position close to the centre of the disc is mounted in bearings to one end of each arm 18. When the roll 19 moves, the roll 17 acts as a joint; the position of the movable roll 19 close to the centre of the disc is indicated with broken lines in FIG. 1. The belt 1 moves between the discs.

In the following, the main steps of the winding process are described with reference to FIGS. 3 to 13.

Figure 3:
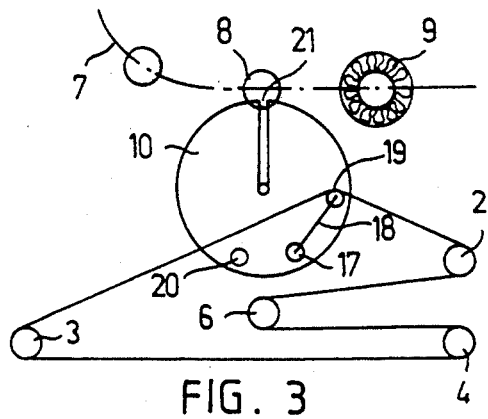
FIGS. 3 to 13 show the main steps of the winding process seen from the side.

In FIG. 3, the situation is the same as in FIG. 1, that is, an empty core 8 has arrived at the winding means and it has been displaced on to the supports 16 at the end of the piston rods of the lifting cylinders 15, whereafter the cylinders 15 start to displace the core towards the centre of the discs 10.

Figure 4:
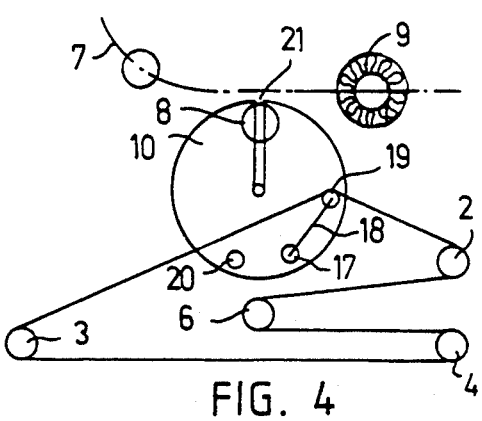

After the core 8 has been displaced to the position shown in FIG. 4, it is stopped momentarily, whereafter the discs 10 start to turn anti-clockwise, while the movement of the core towards the centre of the discs is continued.

Figure 5:
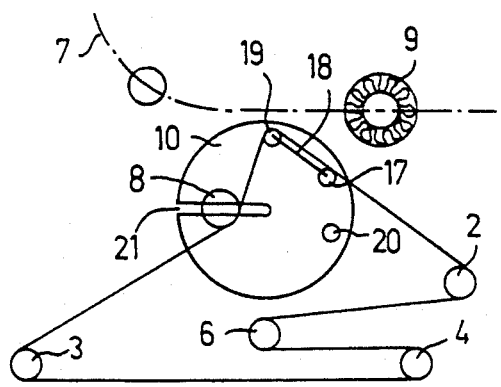

In FIG. 5, the discs 10 have turned through 90°, and the core 8 is positioned about midway between the periphery and the centre of the discs. The belt 1 makes contact with the core 8, and the roll 17 likewise makes contact with the belt 1.

Figure 6:
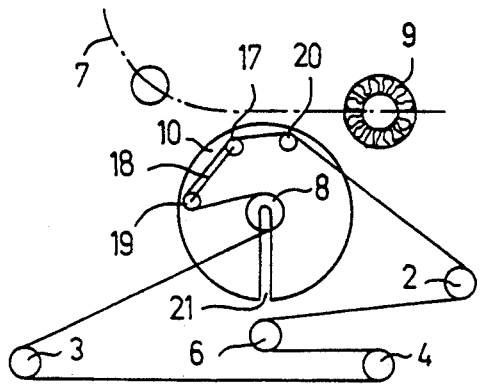

In FIG. 6, the discs have turned through 180°, and the core 8 has been displaced to the centre of the discs 10, that is, preferably in alignment with the turning shafts 11 of the discs. The roll 20 mounted to the discs 10 makes contact with the belt 1.

Figure 7:
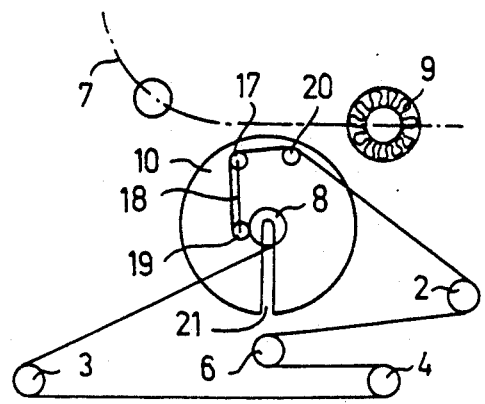

In FIG. 7, the roll 19 has been displaced towards the centre of the discs, into contact with the core 8.

Figure 8:
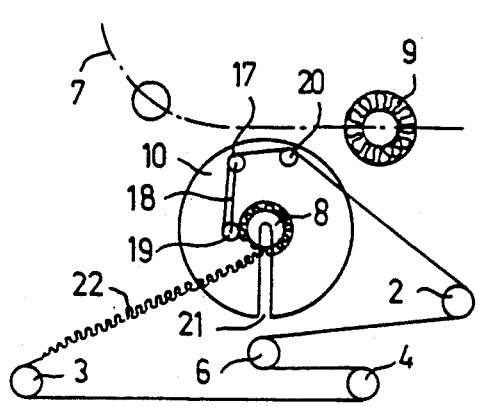

Thereafter the winding of a ply 22 of a wool material is started as shown in FIG. 8, whereby the roll 19 yields. The roll 19 can be moved, e.g., by means of a pneumatic cylinder not shown in the drawing, and a predetermined counterpressure may prevail in the pneumatic cylinder. The winding is continued until a desired thickness is achieved, whereafter the ply is cut off. The desired thickness can be determined, e.g., on the basis of the displacement of the belt, or if a thin chute is to be obtained, the ply can be cut into a determined length in advance.

Figure 9:
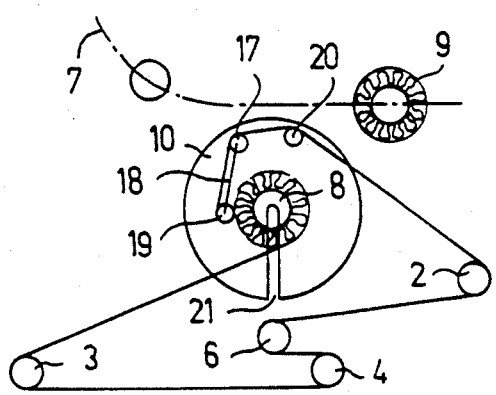
Figure 10:
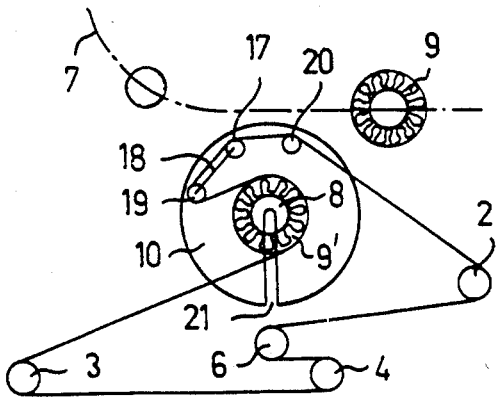
Figure 11:
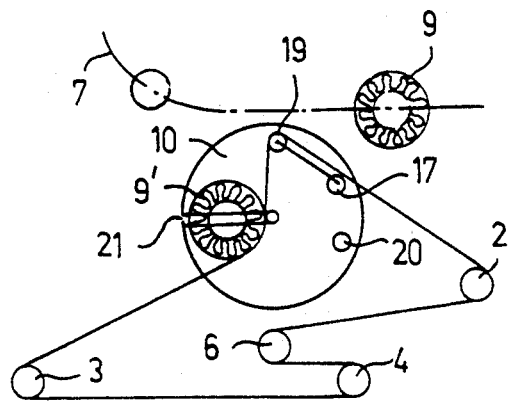
Figure 12:
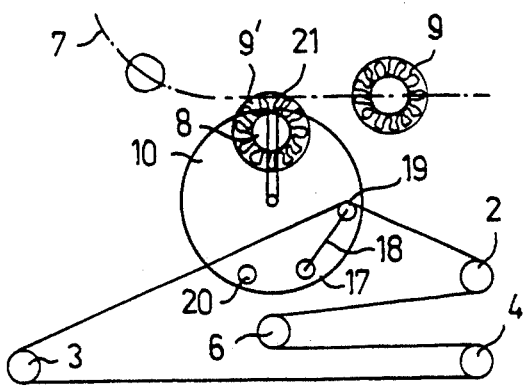
Figure 13:
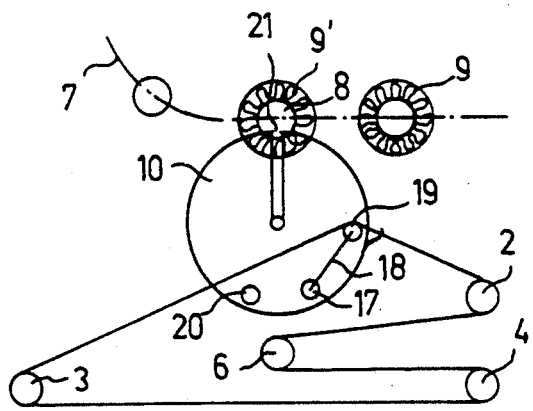

In FIG. 9, the winding process has been completed, and the discs 10 start to turn clockwise, and the cylinders 15 displace the core with an insulation 9' back towards the periphery of the discs 10, as appears from FIGS. 10 to 13. In the position of FIG. 12, the displacing movement stops momentarily, and the discs 10 stop, whereafter the cylinders 15 lift the core 8 with the insulation 9' back on to the conveyor 7.

The turning angle of the discs 10 varies with the diameter of the core. If the diameter of the core 8 is small, the turning angle of the discs varies from about 130° to about 150° when the core is in the winding position near to or in alignment with the shafts 11 of the discs 10. With large-diameter cores, the turning angle of the discs 10 correspondingly varies from about 210° to about 240°. The turning angle of 180° of the discs in the drawing is possible with one specific core diameter only. The turning angle of the discs is a determined function of the core diameter, and the turning angles for different core diameters can be precomputed. Further, the stopping of the discs at the right position in each particular case can be ensured by means of an angle gauge known per se.

I claim:

1. Apparatus for winding a ply of an insulating material onto a core to form a chute, comprising:

first and second spaced apart support members, said support members being generally parallel to each other and supported for rotating movement about a common axis between a ready position and an operation position;

a moveable endless belt supported for movement along a path located between the support members;

core engaging means located adjacent the support members and moveable relative thereto for engaging empty cores and moving an empty core to a core winding position wherein the core is generally co-axial with said common axis, and for moving a wound core from the core winding position to a core discharge position; and a roller mounted on the support members and moveable relative thereto, to engage the endless belt and to move the belt (i) to a position extending around the core in the winding position, wherein the belt guides the insulating material ply onto one of the cores to form a chute thereon, and (ii) away from the core in the winding position.

2. An apparatus according to claim 1, wherein:

the support members rotate through a given angle as the support members rotate from the ready position to the operating position; and the value of the given angle increases as the diameters of the empty cores increase.

3. An apparatus according to claim 1, wherein the core engaging means is mounted on the first and second support members and is adapted to move the cores to and away from the core winding position while the support members rotate between the ready and operating positions.

* * * * *

UNITED STATES PATENT AND TRADEMARK OFFICE
CERTIFICATE OF CORRECTION

PATENT NO. : 5,143,314

DATED : September 1, 1992

INVENTOR(S) : Osmo Soikkeli

It is certified that error appears in the above-identified patent and that said Letters Patent is hereby corrected as shown below:

Column 4, lines 2-3, Claim 1: "operation" should read as --operating--

Signed and Sealed this

Twenty-eighth Day of September, 1993

*Attest:*

BRUCE LEHMAN

*Attesting Officer*     *Commissioner of Patents and Trademarks*